(No Model.)
A. A. SIMMONS.
TOBACCO PLANTER.
No. 355,478. Patented Jan. 4, 1887.
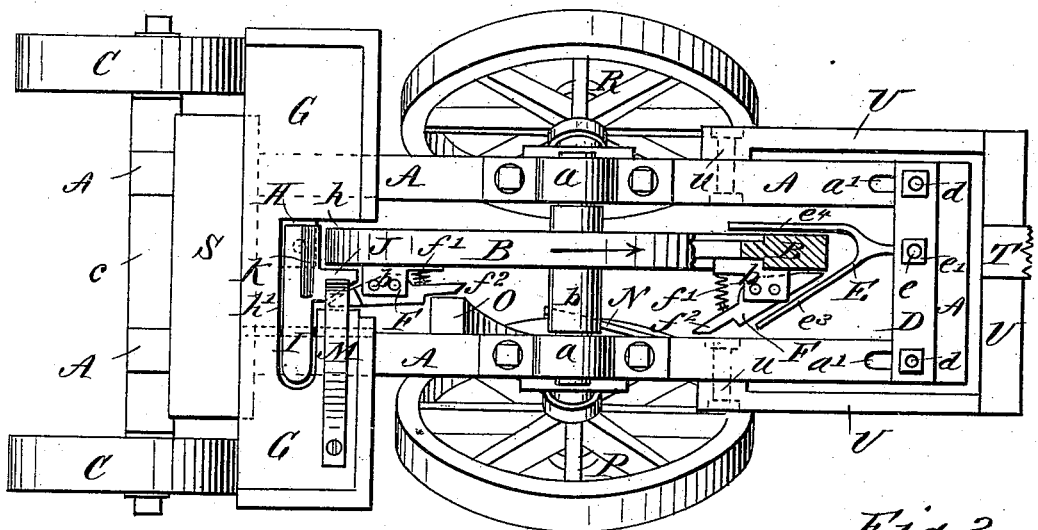
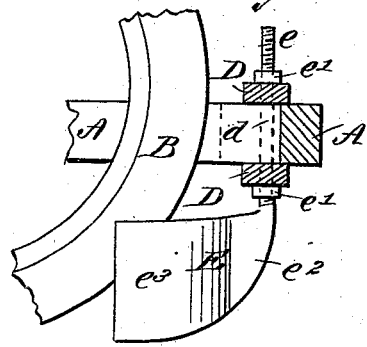
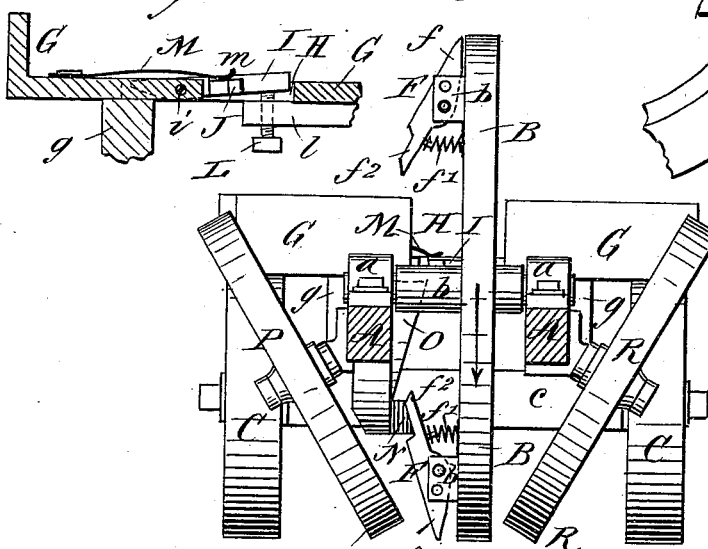
WITNESSES:
Donn Twitchell
C. Sedgwick
INVENTOR:
A. A. Simmons
BY Munn & Co
ATTORNEYS.

UNITED STATES PATENT OFFICE.

ANDREW ADELBERT SIMMONS, OF GREENVALE, ILLINOIS.

TOBACCO-PLANTER.

SPECIFICATION forming part of Letters Patent No. 355,478, dated January 4, 1887.

Application filed September 15, 1886. Serial No. 213,606. (No model.)

*To all whom it may concern:*

Be it known that I, ANDREW ADELBERT SIMMONS, of Greenvale, in the county of Jo Daviess and State of Illinois, have invented a new and Improved Tobacco-Planter, of which the following is a full, clear, and exact description.

My invention relates to a planting-machine adapted especially for automatically setting tobacco-plants, but applicable also for setting or resetting other plants or seeds; and the invention has for its object to provide a simple, comparatively inexpensive, and effective machine of this character whereby plants or seeds may be properly set with economy of time and labor.

The invention consists in certain novel features of construction and combinations of parts of the planter, all as hereinafter fully described and claimed.

Reference is to be had to the accompanying drawings, forming a part of this specification, in which similar letters of reference indicate corresponding parts in all the figures.

Figure 1 is a plan view of my improved tobacco-planter, with the plant-carrier wheel partly broken away and in section. Fig. 2 is a front elevation of the planter with its frame in cross-section; and Figs. 3 and 4 are detail views.

In the frame A of the tabacco-planter a large wheel, B, which carries the plants to the ground, as hereinafter described, is journaled by its axle $b$ in bearings $a$ $a$, fixed to the opposite side bars of the frame. At its rear end the frame is supported on wheels C C, the axle $c$ of which is preferably fixed to the frame, and the frame has support from the ground at its forward part by the inclined wheels P R, which throw the earth back into the furrow and pack it around the roots of the plants, as hereinafter explained. The wheels C C P R thus support the frame and allow the wheel B to revolve independently.

To the front of the frame A there are held by bolts $d$ $d$, passing through slots $a'$ $a'$ in the frame, upper and lower cross-bars, D D, through which the screw-threaded shank $e$ of a furrow-opening plow, E, passes, and the plow-shank is fitted with nuts $e'$ $e'$, allowing the plow to be adjusted vertically to work at any required depth in the ground. The slots $a'$ on the frame allow the plow to be set nearer to or farther from the plant-carrying wheel. The furrow-opening plow has a sharp nose portion, $e^2$, to enter the ground easily, and has two rear wings, $e^3$ $e^4$, which stand one at each side of the rim of the wheel B, to open a clean furrow somewhat wider than the tread of the wheel and to protect the plant-clamps F, which are held to the right-hand or off side of the wheel-rim. These clamps F consist, preferably, of clip-blocks $f$, which are pivoted to lugs $b$ on the wheel B, and are pressed at their outer ends to or toward the wheel by springs $f'$. (See Figs. 1 and 2 of the drawings.)

Behind the wheel B a plant-holding table, G, is supported from the frame A by blocks $g$ $g$, or it may be otherwise. This table has an opening, H, into the part $h$ of which the rim of the wheel B enters, and in the part $h'$ of the opening H is pivoted at $i$ a plant-holding bed, I, which has an arm, J, projecting into the part $h$ of opening H and standing at one edge quite closely to the side of the wheel B, and at its other or outer edge the arm J is beveled off toward its end to allow the opened ends or jaws $f$ of the clamps F to pass the arm, which holds the clamps open until they pass above the arm to clamp the plants to the face of the carrier-wheel, as presently explained.

The plant-bed I is provided with a groove or concavity, K, which groove serves as a gage, by affording a rest for the feeder's thumb and finger which grasp the stem of the plant between its leaves and roots, thus allowing the plants to be placed with ease in proper position, with the leafy parts lying forward on the arm J of the bed, to be grasped by the clamps of the carrier-wheel B. A set-screw, L, threaded into a lug, $l$, fixed to the under side of the plant-table and bearing against the bottom of the bed, may be moved endwise to adjust that end of the bed from which the arm J projects, either higher or lower, according to the size of the plants, to cause the carrier-wheel clamps F to seize the plants to the best advantage.

A spring, M, is held at one end to the top of the table G, and its other upturned end, $m$, lies on or above the arm J of the plant-bed I, and holds the leafy parts of the plants well together, to allow the carrier-wheel clamps to grasp the plants without damaging them.

To a block or hanger, $n$, fixed to the frame,

A, there is connected a plate, N, which preferably is elastic, and against which the tails $f^2$ of the jaws of the clamps F strike, to open the jaws at the proper time for dropping the plants into the furrow, and to the frame also is fixed a block, O, having an inclined face upon or against which the tails of the clamps rise to open the clamp-jaws as they rise to the table G to grasp the next plant.

At opposite sides of the plant-carrier wheel B wheels P R are journaled in inclined positions on slanting stub-axles fixed to the frame A. These wheels P R press the earth around and onto the sides of the plants after they are deposited in the furrow by the carrier-wheel, and also give support to the machine-frame A from the ground, as hereinbefore explained.

A seat, S, is provided on the frame A, behind the plant table and bed, to accommodate one or two persons, who will feed the plants to the carrier-wheel. This seat and the table will preferably be covered by an awning (not shown) to protect the feeders and the plants from the hot sun.

The draft-pole T, to which the horses will be hitched, is fastened to a frame, U, which is pivoted at $u$ $u$, at the back ends of its side bars, to the machine-frame A. The pole T is broken away in Fig. 1 of the drawings; but it may have any well-known or approved form.

The continuous operation of the machine, briefly stated, is as follows: As the plants are laid upon the bed I at the face of the wheel B, which rotates in direction of the arrow on it, a clamp, F, which had been opened by the block O, as in Fig. 1, grasps a plant laid on the bed I and carries it around forward until it is held root downward in the furrow cut by the plow E, whereupon the tail of the clamp strikes the plate or block N, which opens the clamp, as in Fig. 2, and the plant drops into the furrow and the inclined wheels P R roll the earth back into the furrow and pack it around the root of the plant, the earth being packed by the wheels harder at the base of the furrow than at the surface, where the earth is lightly packed around the plants, and whereby the earth will hold the plants firmly in place to prevent washing out of them by rains, and at the same time allow necessary moisture to pass freely down from the looser surface to the roots of the plants. This manner of packing the earth about the plants is far better than packing it by hand loosely at the base of the furrow and hard at the surface, which allows easy wash-out of the plants and confines the hearts or crowns of the plants so as to stunt their growth. Furthermore, this machine sets the plants in a little hill or ridge above the general ground-level, making it easy to plow closely to the plants in cultivating them, and also preventing washing or drowning out of the plants, which happens occasionally when plants are set by hand at the ground-level. Furthermore, the machine will set the plants without marking the ground, and the plants may be set quickly in freshly-plowed ground before it gets too dry, and the machine sets the plants all the same depth and the same distance apart and packs the earth uniformly about them, so that few die, and a much better stand is secured than by hand-planting. Finally, the planting may be done by the machine with very marked economy of time and labor as compared with planting by hand.

Referring to Fig. 1 of the drawings, it will be noticed that the side or wing $e^4$ of the opening-plow E projects about in the plane of the adjacent face of the plant-carrying wheel B; hence the most of the earth is thrown from the furrow by the inclined wing $e^3$ of the plow, which is so positioned to allow the plant-carrying clamps to pass within it. Consequently the wheel R may be dispensed with at times on soft ground and the presser-wheel P only may be used to pack the earth back into the furrow around the plants.

Any suitable lever-connections may be fitted to the wheel and tongue frames A U to allow lifting of the wheels B R P in turning the machine.

As many of the clamps F may be held to the wheel B as desired, and their number will govern the distance apart at which the plants will be set in the ground, as will readily be understood.

Having thus fully described my invention, what I claim as new, and desire to secure by Letters Patent, is—

1. In a planter, the combination of a frame, A, a wheel, B, journaled thereto, a furrow-opener, E, on the frame, clamps, as at F, on the wheel B, devices, substantially as described, for opening and closing the clamps, and an inclined wheel or wheels, as at P, or P and R, journaled to the frame and adapted to roll the earth back into the furrow and press it around the roots of the plants, substantially as described, for the purposes set forth.

2. In a planter, the combination, with a frame, a wheel, B, journaled thereto, and clamps, as at F, on said wheel, of a bed, I, having an arm, J, projecting at the face of the wheel next the clamps, substantially as described, for the purposes set forth.

3. In a planter, the combination, with a frame, a wheel, B, journaled thereto, and clamps, as at F, on said wheel, of a bed, I, having an arm, J, projecting at the face of the wheel to support the plants, and also having a groove or recess, K, to gage the feeding of the plants, substantially as described, for the purposes set forth.

4. In a planter, the combination, with a frame, a wheel, B, journaled thereto, and clamps, as at F, on said wheel, of a bed, I, having an arm, J, and said bed arranged to be vertically adjustable, substantially as shown and described.

5. In a planter, the combination, with a frame, a wheel, B, journaled thereto, and clamps, as at F, on said wheel, of a bed, I, having an arm, J, and pivoted to the frame to allow vertical adjustment of said arm, substantially as shown and described.

6. In a planter, the combination, with a frame, A, a wheel, B, journaled thereto, and clamps, as at F, on said wheel, of a plant-holding table, G, slotted at H, and a bed, I, having an arm, J, and pivoted at $i$ in said slot, substantially as shown and described.

7. In a planter, the combination, with a frame, A, a wheel, B, journaled thereto, and clamps, as at F, on said wheel, of a bed, I J, and a spring, M, having a bent end, $m$, resting on the bed, substantially as described, for the purposes set forth.

ANDREW ADELBERT SIMMONS.

Witnesses:
 WILBER L. GREND,
 ANDREW SIMMONS.